(12) United States Patent
Ide (10) Patent No.: US 10,414,117 B2
(45) Date of Patent: Sep. 17, 2019

(54) TILE UNIT

(71) Applicant: GLOBAL STONE MATERIAL, INC., Tokyo (JP)

(72) Inventor: Hiroshi Ide, Tokyo (JP)

(73) Assignee: GLOBAL STONE MATERIAL, INC., Tokyo (JP)

( * ) Notice: Subject to any disclaimer, the term of this patent is extended or adjusted under 35 U.S.C. 154(b) by 0 days.

(21) Appl. No.: 15/920,720

(22) Filed: Mar. 14, 2018

(65) Prior Publication Data
US 2018/0290421 A1    Oct. 11, 2018

(51) Int. Cl.
| | | |
|---|---|---|
| *B32B 3/16* | (2006.01) | |
| *B32B 5/02* | (2006.01) | |
| *B32B 9/00* | (2006.01) | |
| *B32B 9/04* | (2006.01) | |
| *B32B 17/06* | (2006.01) | |
| *E04F 13/08* | (2006.01) | |
| *E04F 13/10* | (2006.01) | |
| *E04F 13/14* | (2006.01) | |

(52) U.S. Cl.
CPC .............. *B32B 3/16* (2013.01); *B32B 5/028* (2013.01); *B32B 9/002* (2013.01); *B32B 9/047* (2013.01); *B32B 17/067* (2013.01); *E04F 13/0862* (2013.01); *E04F 13/0883* (2013.01); *B32B 2250/03* (2013.01); *B32B 2262/02* (2013.01); *B32B 2307/208* (2013.01); *B32B 2419/04* (2013.01); *E04F 13/10* (2013.01); *E04F 13/14* (2013.01); *E04F 13/142* (2013.01); *E04F 13/145* (2013.01); *Y10T 428/16* (2015.01); *Y10T 428/163* (2015.01); *Y10T 428/164* (2015.01); *Y10T 428/166* (2015.01); *Y10T 428/167* (2015.01)

(58) Field of Classification Search
CPC .............. Y10T 428/16; Y10T 428/163; Y10T 428/164; Y10T 428/166; Y10T 428/167; B32B 3/16; B32B 2419/04; E04F 13/0862; E04F 13/0883; E04F 13/14; E04F 13/144; E04F 13/145; E04F 13/147
See application file for complete search history.

(56) References Cited

U.S. PATENT DOCUMENTS 1,815,404 A * 7/1931 Greenebaum ....... E04F 13/0862
                                                          52/384
2,887,867 A * 5/1959 Burchenal ............... B32B 37/00
                                                          156/299
(Continued)

FOREIGN PATENT DOCUMENTS

| JP | 50-45812 | 4/1975 |
|---|---|---|
| JP | 4-6426 U1 | 1/1992 |

(Continued)

OTHER PUBLICATIONS

Japanese Registrability Report dated Sep. 19, 2018 with partial English translation, 7 pages.

*Primary Examiner* — Alexander S Thomas
(74) *Attorney, Agent, or Firm* — Rankin, Hill & Clark LLP (57) ABSTRACT

Disclosed is a tile unit (10) that includes a resin net (20), a plurality of tiles (30) disposed on a front side of the resin net, and a magnet sheet (40) disposed on a back side of the resin net, with the tiles being bonded and fixed to the magnet sheet with the resin net interposed therebetween.

4 Claims, 6 Drawing Sheets

(56) References Cited

U.S. PATENT DOCUMENTS

| | | | | |
|---|---|---|---|---|
| 3,177,273 A | * | 4/1965 | Fingerhut | ........... E04F 13/0862 |
| | | | | 264/261 |
| 2012/0000156 A1 | | 1/2012 | Esposito | |
| 2017/0114547 A1 | * | 4/2017 | Boyd | .................... E04F 13/075 |

FOREIGN PATENT DOCUMENTS

| | | |
|---|---|---|
| JP | 09-111997 | 4/1997 |
| JP | 2000-096802 | 4/2000 |
| JP | 2003-314033 | 11/2003 |
| JP | 2005-139896 | 6/2005 |

\* cited by examiner

TILE UNIT

FIELD OF THE INVENTION

The present invention relates to tile units that allow a plurality of tiles to be mounted onto a wall surface or the like as a unit.

BACKGROUND OF THE INVENTION

A technique for mounting a tile or tiles onto a wall surface or the like with a magnet or magnets is known, as disclosed in Japanese Patent Application Laid-Open Publication No. 09-111997, for example.

The tile disclosed in Japanese Patent Application Laid-Open Publication No. 09-111997 is composed of a molded body, which is formed from a thin metal plate, and a magnetic body mounted on the back surface of the molded body. The magnetic body enables the tile to be attached to an iron plate. Therefore, it is possible to mount and remove the tile. In addition, the molded body of a thin metal plate provides a solid-looking tile surface.

Japanese Patent Application Laid-Open Publication No. 09-111997 is silent as to the intended use of the tile. It is speculated that the tile may be used for a nameplate with a company name inscribed thereon or for a doorplate at a residence, for example. When the tile is used for such purposes, the lengthwise (or widthwise) dimension of the tile is typically from 50 mm to 500 mm.

Among tiles, there is a mosaic tile. Mosaic tiles are tile units that provide a sophisticated design appearance as a large number of tile pieces, each measuring several millimeters to several tens of millimeters, are arranged.

When the technique disclosed in Japanese Patent Application Laid-Open Publication No. 09-111997 is applied to a mosaic tile, the following problem arises.

In order to mount a magnetic body to each of the tile pieces of the mosaic tiles, the magnetic body needs to be prepared in a number equal to the number of the tile pieces. This increases the number of times the magnetic bodies are mounted, and in turn increases the mounting cost. Furthermore, each magnetic body has small dimensions, and therefore it is troublesome to mount the magnetic bodies. This further increases the mounting cost. Consequently, the mosaic tiles become expensive.

Expensive mosaic tiles find limited usage and demand.

In consideration of promoting the widespread use of mosaic tiles, there is room for improvements.

SUMMARY OF THE INVENTION

An object of the present invention is to provide a tile unit that allows a plurality of tiles to be mounted onto a wall surface or the like as a unit and that is less expensive.

According to a first aspect of the present invention, there is provided a tile unit that includes a resin net, a plurality of tiles disposed on a front side of the resin net, and a magnet sheet disposed on a back side of the resin net.

In the tile unit, the tiles are bonded and fixed to the magnet sheet with the resin net interposed therebetween.

In the present invention, a plurality of tiles are bonded and fixed to the magnet sheet with the resin net interposed therebetween. The thickness of an element (twisted yarn) in the resin net slightly varies depending on the position. Therefore, the tiles become slightly tilted relative to the magnet sheet. Consequently, the tiles become slightly ragged, and the reflection off the front surface becomes irregular. This provides an interesting design appearance.

A plurality of tiles may be bonded and fixed in advance to the front surface side of a single resin net, and then a single magnet sheet may be bonded to the back side of the resin net.

In other words, a plurality of tiles can be bonded and fixed to the single magnet sheet with the resin net interposed therebetween. As compared to a case in which a single magnet sheet is bonded and fixed to a single tile, the present invention can reduce the cost for mounting a magnet sheet, and a less expensive tile unit is provided. Providing a tile unit having a sophisticated design appearance inexpensively can promote the widespread use of the tile unit.

Preferably, a jointing space is provided (left) between one of the tiles and an adjacent one of the tiles. Each of the tiles preferably has a trapezoidal shape in a cross-sectional view, and a back surface of each tile, which comes into contact with the resin net, has a smaller area than a front surface thereof.

A side surface between the back surface and the front surface is tilted, and outside light is less likely to hit the lateral surface. Therefore, the sophisticated design appearance on the front surface of the tiles is not spoiled.

Preferably, each of the tiles is made of any one of glass, natural rock, ceramics, wood, and painted resin.

Glass, natural rock, ceramics, wood, and painted resin all provide glossiness, and a sense of luxuriousness.

Preferably, the natural rock includes crushed rock obtained by crushing natural rock, a pebble that is a type of natural rock, and an adhesive resin that bonds the crushed rock to the pebble.

The crushed rock and the pebble provide various reflection surfaces, and therefore an optically interesting phenomenon can be expected.

According to a second aspect of the present invention, there is provided a tile unit that includes a resin net, a plurality of tiles disposed on a front side of the resin net, and a case disposed on a back side of the resin net.

In the tile unit, the tiles are bonded and fixed to the resin net.

The tiles bonded and fixed to the resin net is housed in the case. The thickness of an element (twisted yarn) in the resin net slightly varies depending on the position. Therefore, the tiles tilt slightly. Consequently, the tiles become slightly ragged, and the reflection off the front surface becomes irregular. This provides an interesting design appearance.

A plurality of tiles are bonded and fixed in advance to the front side of a single resin net, and this is housed in a single case.

Because the tiles can be housed in the single case as a unit, a less expensive tile unit is provided. Providing a tile unit having a sophisticated design appearance inexpensively can promote the widespread use of the tile unit.

BRIEF DESCRIPTION OF THE DRAWINGS

Several preferred embodiments of the present invention will be described with reference to the accompanying drawings, in which

FIG. 2A, FIG. 2B and FIG. 2C are a set of views useful to describe the tiles shown in FIG. 1 in detail, specifically.

FIG. 3A, FIG. 3B and FIG. 3C are a set of views useful to describe the resin net shown in FIG. 1 in detail, specifically.

DETAILED DESCRIPTION OF THE PREFERRED EMBODIMENTS

Figure 1:
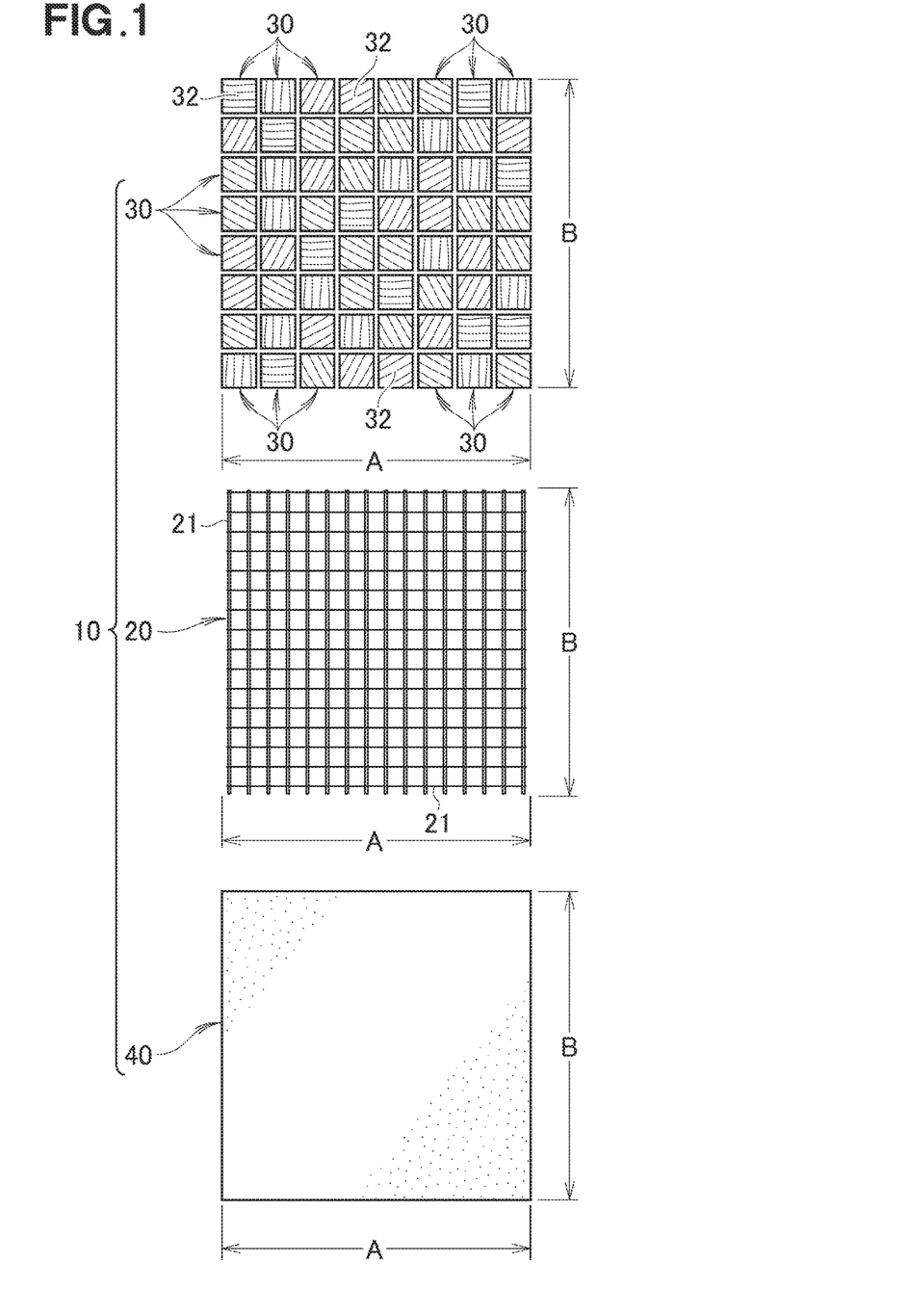
FIG. 1 is an exploded view of a tile unit according to an embodiment of the present invention.

Referring to FIG. 1, a configuration of a tile unit 10 according to an embodiment of the present invention will be described.

The tile unit 10 includes a resin net 20 illustrated in the center of FIG. 1, a plurality of (in this example, 8×8=64) tiles 30 disposed on a front side of the resin net 20, and a magnet sheet 40 disposed on a back side of the resin net 20.

The magnet sheet 40 is a rectangular sheet having a thickness of 0.4 mm to 3.0 mm, a widthwise dimension of "A," and a lengthwise dimension of "B." Preferably, the side of the magnetic sheet 40 that comes into contact with the resin net 20 is white or silver. The side of the magnet sheet 40 that faces a wall surface (the reference numeral 50 in FIG. 4) can be in any color, e.g., black or brown.

"A" is selected from a range of 50 mm to 1000 mm, and "B" is also selected from a range of 50 mm to 1000 mm. "A" and "B" are basically equal to each other, but they may be different from each other.

The resin net 20 is made, for example, of a twisted yarn 21 obtained by twisting a small-diameter resin filament. The twisted yarn 21 has a diameter of 0.5 mm to 1.0 mm.

The resin net 20 is preferably a lattice net in which the twisted yarn 21 is disposed in the lengthwise and widthwise directions. It is satisfactory as long as the mesh size be smaller than the lengthwise (or widthwise) dimension of each tile 30, and the mesh size is, for example, 5 mm.

The resin net 20 is preferably white. When the resin net 20 has the same color as the magnet sheet 40, the resin net 20 is less noticeable on a front surface 41 of the magnet sheet 40.

The resin net 20 can be modified to a net made of a natural twisted yarn or a net made of a paper twine, but a natural twisted yarn or a paper twine rots upon absorbing water. In this respect, a resin filament does not experience rotting upon absorbing water.

Figure 2A:
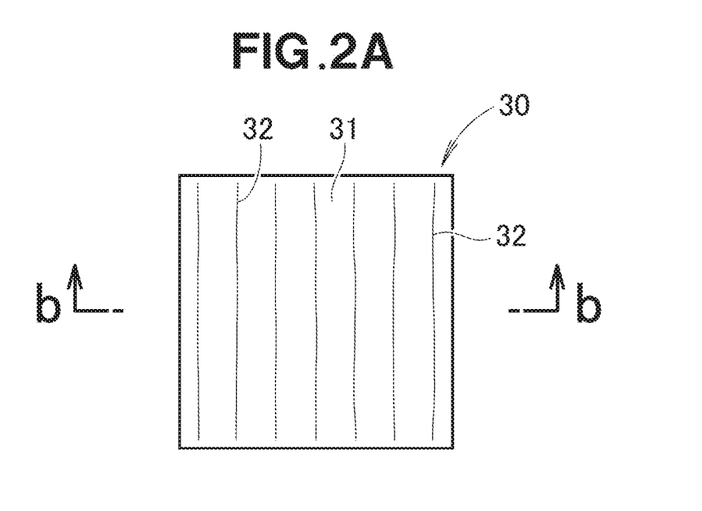
FIG. 2A is a front view of a single tile.
Figure 2B:
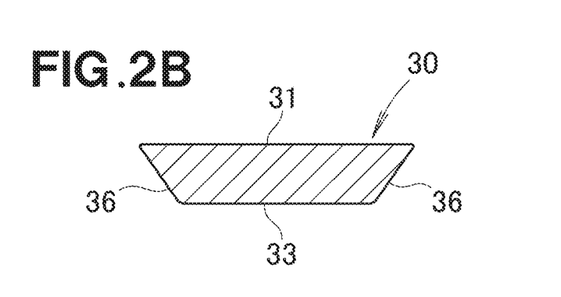
FIG. 2B is a cross-sectional view of the tile taken along the line b-b in FIG. 2A.
Figure 2C:
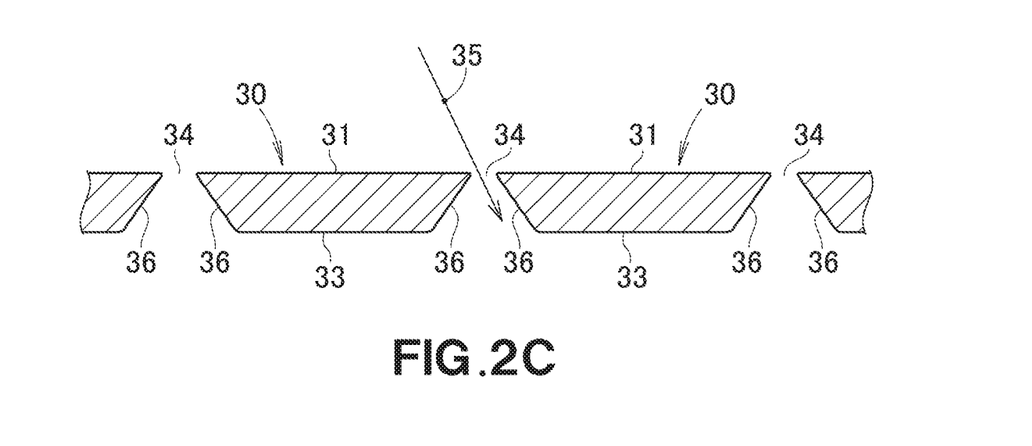
FIG. 2C is a view useful to describe a joint portion between tiles.

Referring to FIGS. 2A to 2C, the tile 30 will be described in detail.

As illustrated in FIG. 2A, the tile 30 is preferably a square plate. It should be noted, however, that the tile 30 may be rectangular, circular, elliptical, oval, or rhomboid. Each of the sides of the tile 30 may have any value in a range of 3 mm to 300 mm, and 5 mm, 10 mm, or 20 mm is recommended.

The tile 30 may be made of any one of glass, natural rock, ceramics, resin, imitation rock, wood, paper, metal, or a combination thereof. For example, a resin substrate may be coated with a paint in which metal pieces are mixed. Alternatively, the tile 30 may be a mud-based tile formed by solidifying volcanic ash, sand, or mud.

Among the above, glass, natural rock, ceramics, wood, and painted resin excel in glossiness and are desirable.

Among glass, natural rock, ceramics, wood, and painted resin, glass can be molded with ease and is desirable.

When the tile 30 is made of glass, a pattern such as a stripe pattern (including a wave pattern) 32 can be formed in a front surface 31 with ease within a process of glasswork.

The tile 30 may be a right-triangular plate. This is because non-square tiles 30 are useful when a picture is expressed with the tiles 30 in the form of a mosaic image.

FIG. 2B is a sectional view taken along the b-b line in FIG. 2A. The tile 30 preferably has a thickness of approximately 3.5 mm and has a trapezoidal shape in a cross-sectional view. Furthermore, a back surface 33, which comes into contact with the resin net 20, of the tile 30 preferably has a smaller area than the front surface 31.

One of the reasons therefor will be described with reference to FIG. 2C.

As illustrated in FIG. 2C, when a jointing space 34 is provided (or left) between one tile 30 and an adjacent tile 30, outside light 35 passes through the jointing space 34 and hits a lateral surface 36 of the tile 30. When the lateral surface 36 shines upon being hit by the outside light 35, the sophisticated design appearance of the front surface 31 is spoiled.

As a countermeasure, the tile 30 is formed to have a trapezoidal shape in a cross-sectional view, and the back surface 33 is made to have a smaller area than the front surface 31. As a result, the lateral surface 36 becomes tilted, and the outside light 35 does not hit the lateral surface 36. Even if the outside light 35 hits the lateral surface 36, reflection light does not travel to the outside. Consequently, the lateral surface 36 does not shine upon being hit by the outside light 35. Therefore, the front surface 31 of the tile 30 can serve as a sophisticatedly designed surface.

It should be noted that filling (charging) the jointing space 34 with a white or transparent jointing material does not pose any problem. In this embodiment, however, the jointing space 34 is not filled with anything. Filling the jointing space 34 with nothing enhances a stereoscopic effect of each tile 30. On the other hand, filling the jointing space 34 with a jointing material prevents the jointing space 34 from being clogged with dir. This facilitates cleaning. Therefore, whether to fill the jointing space 34 with a jointing material or not can be determined as desired.

Figure 3A:
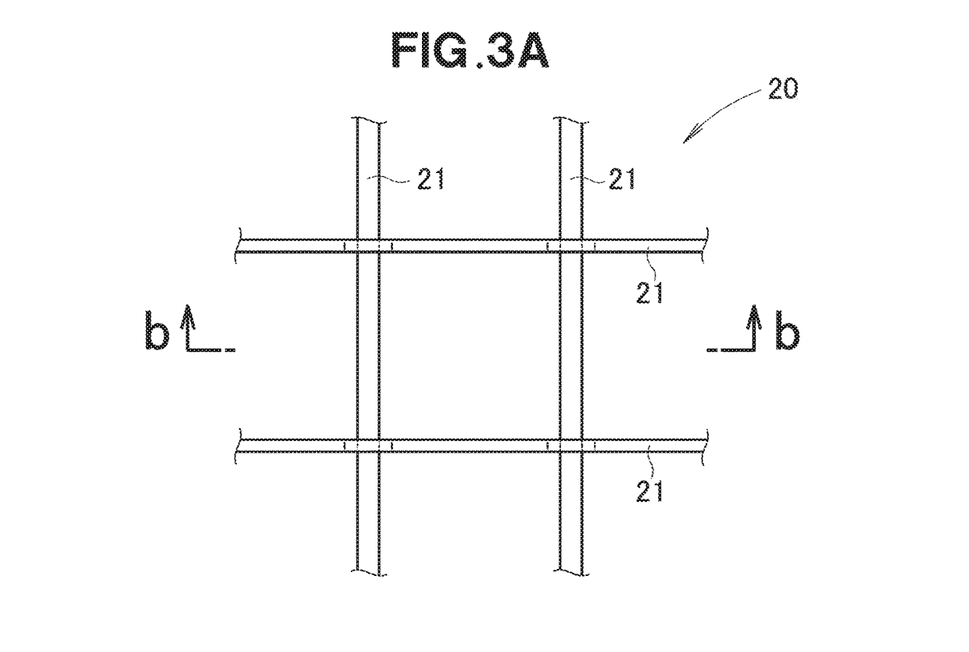
FIG. 3A is an enlarged view of the resin net.
Figure 3B:
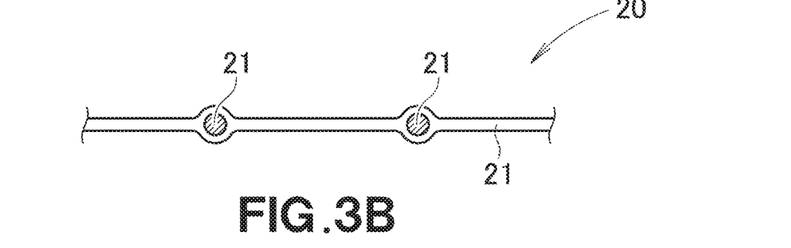
FIG. 3B is a cross-sectional view of the resin net taken along the line b-b in FIG. 3A.
Figure 3C:
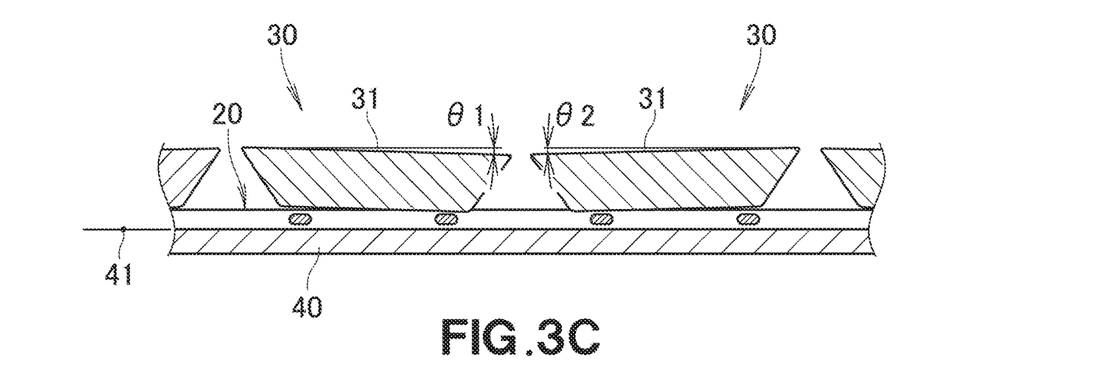
FIG. 3C is a view useful to describe inclinations of the front surfaces of the tiles.

Referring to FIGS. 3A to 3C, the resin net 20 will be described in detail.

As illustrated in FIG. 3A, the resin net 20 is preferably a lattice net. It should be noted, however, that the resin net 20 may be a hexagonal net or a rhombus net.

FIG. 3B is a cross-sectional view taken along the b-b line in FIG. 3A. The diameter (thickness) of the twisted yarn 21 is not uniform. In addition, the twisted yarn 21 flattens upon receiving an external force.

As shown in FIG. 3C, the tiles 30 and 30 are bonded and fixed to the front surface of the resin net 20, and the magnet sheet 40 is bonded and fixed to the back surface of the resin net 20. In this case, the resin net 20 is compressed in a nonuniform manner. Then, one of the tiles 30 is mounted onto the magnet sheet 40 with the front surface 31 of the tile 30 being tilted by an angle θ1 relative to the front surface 41 of the magnet sheet 40. In addition, the other one of the tiles 30 is mounted onto the magnet sheet 40 with the front surface 31 of the tile being tilted by an angle θ2 relative to the front surface 41 of the magnet sheet 40. The angle θ1 and the angle θ2 inevitably differ from each other. A difference in the angle of reflection is produced between the two front surfaces 31, and a stereoscopic effect is created as a whole. This enhances design sophistication.

In FIG. 3C, an adhesive plays a role of bonding and fixing the magnet sheet 40 onto the back surface of the resin net 20. In addition, a certain part of the adhesive plays a role of directly bonding and fixing the tiles 30 onto the magnet sheet 40. In other words, this embodiment of the present invention provides the tile unit 10 having a structure in which the tiles 30 are bonded and fixed to the magnet sheet 40 with the resin net 20 interposed therebetween.

The twisted yarn 21 is highly elastic. If an external object hits the front surface 31 of the tile 30 in FIG. 3C, the resin net 20 absorbs the impact. Consequently, the tile 30 is less likely to break or be damaged upon an object making contact with the tile 30.

Figure 4:
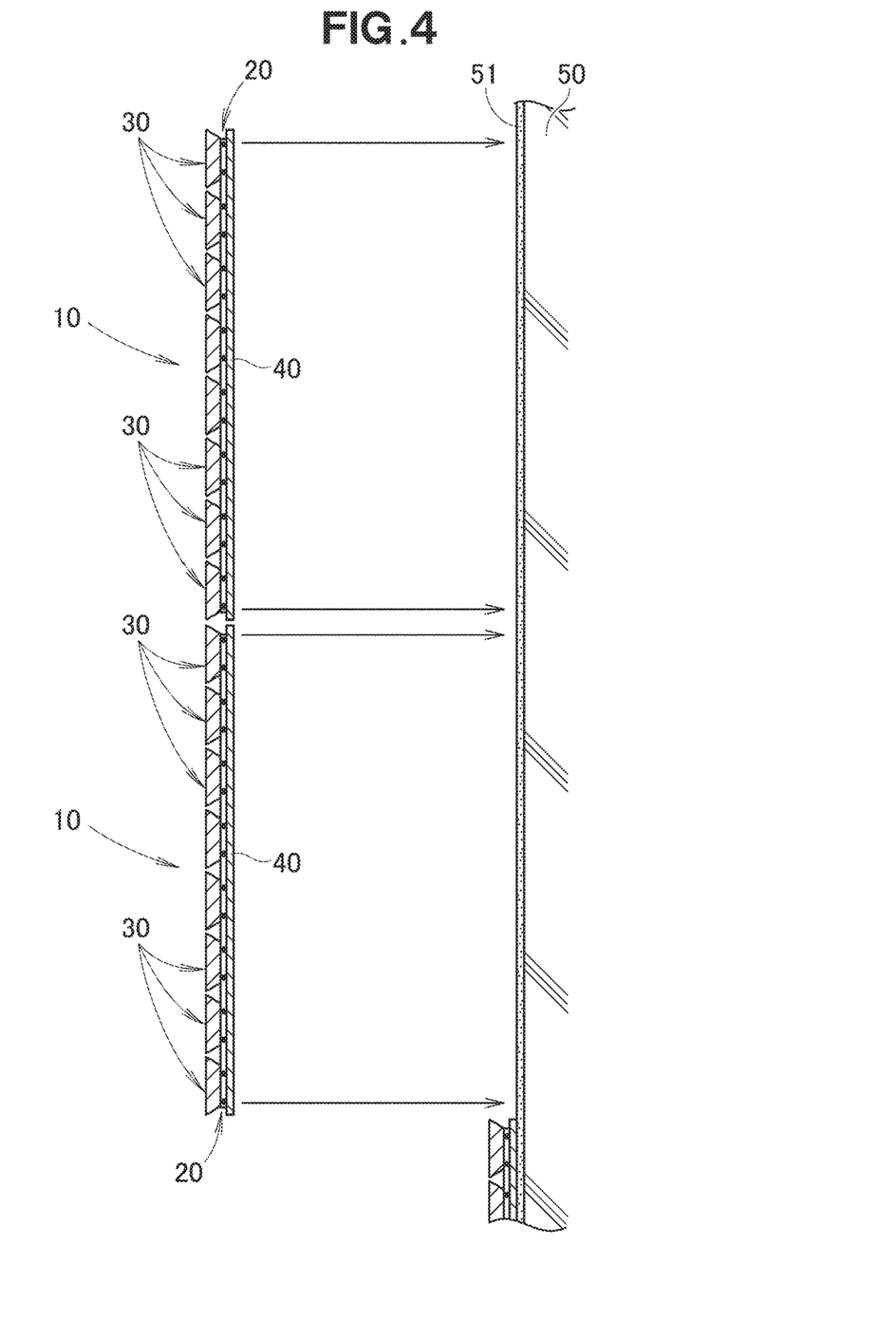
FIG. 4 is a view useful to describe a process of mounting tile units on a wall surface.

Therefore, the tile unit 10 as illustrated in FIG. 4 is obtained. Specifically, the tile unit 10 has the tiles 30 such that the tiles 30 are bonded and fixed to the magnet sheet 40 with the resin net 20 interposed therebetween.

A procedure for mounting the tile unit 10 having the above-described structure to a wall surface 50 will now be described.

As illustrated in FIG. 4, preferably, the wall surface 50 is coated with a magnetic paint to form a magnetic paint layer 51. The magnetic paint is a paint that contains a suitable amount of iron powder particulates. By coating the wall surface 50 with the magnetic paint a plurality of times, the magnetic paint layer 51 with a predetermined (or desired) thickness can be formed. Alternatively, the magnetic paint layer 51 may be a thin plate made of an iron-based material.

As the magnet sheet 40 is magnetically attached to the magnetic paint layer 51, the tile unit 10 is mounted onto the wall surface 50.

When the tiles are made of glass, ceramics, or natural rock, the tile unit 10 is heavy. However, the magnet sheet 40 produces a gripping force of several tens times more than the own weight of the tile unit 10, and therefore the tile unit 10 does not fall. Even if the tile unit 10 moves due to a large earthquake or the like, the tile unit 10 can be put back in place with ease.

The affixing operation can be performed by a general service person or an ordinary person other than a tiling professional.

When tiles are affixed to the wall surface 50 with mortar or an adhesive as in a conventional construction method, a curing period is required until the strength of the mortar or the adhesive is ensured. The embodiment of the present invention, however, renders such a curing period unnecessary.

Therefore, the time and the cost required for the affixing can be reduced to a great extent.

A construction example of the tile unit 10 will be described with reference to FIG. 5.

Figure 5:
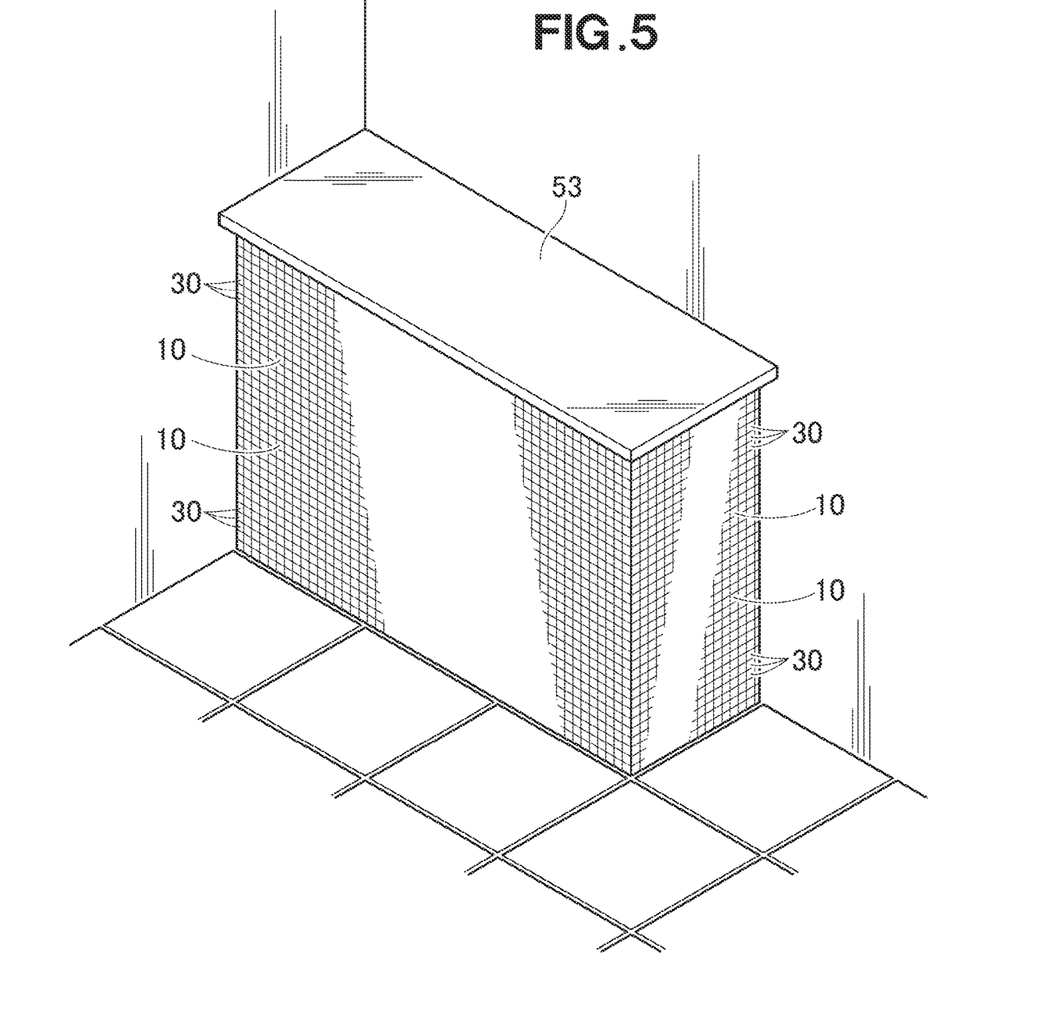
FIG. 5 is a perspective view of a construction example of the tile units.

As illustrated in FIG. 5, the tile units 10 are affixed to lateral walls of a marble counter 53. The tile units 10 of the embodiment of the present invention can be replaced even by an ordinary person, and therefore the tile units 10 may be replaced with tile units of different colors and/or patterns for each season, for example.

Figure 6A:
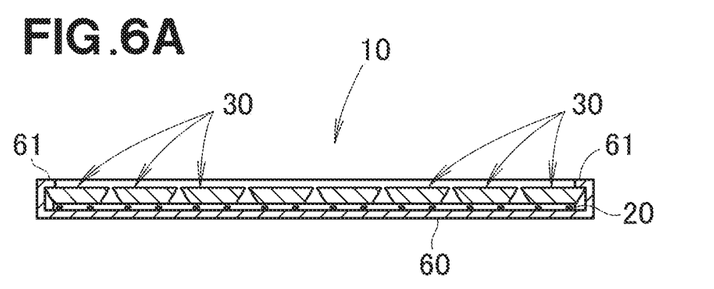
FIG. 6A, FIG. 6B and FIG. 6C are views to show different modifications of the tile units.
Figure 6B:
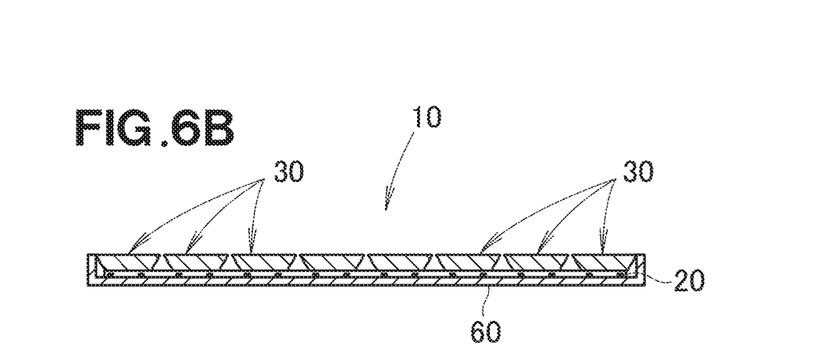
Figure 6C:
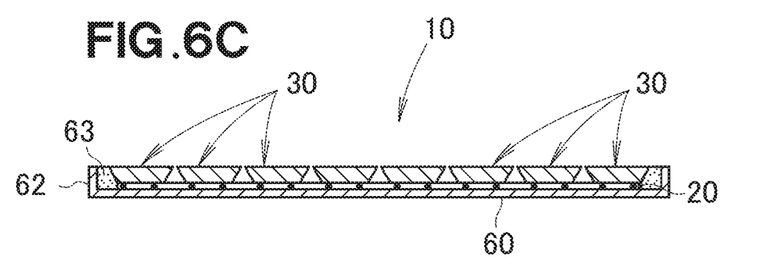

Referring to FIGS. 6A to 6C, modifications will now be described.

As illustrated in FIG. 6A, the tile unit 10 includes the resin net 20, the tiles 30 disposed on the front side of the resin net 20, and a case 60 disposed on the back side of the resin net 20. The case 60 is made of resin or metal, and includes an edge 61 that is integrally formed with the case 60 and that projects inward from an opening edge of the case.

A unit in which the tiles 30 are bonded and fixed to the resin net 20 is housed into the cylindrical case 60 having a bottom. At this point, the edge 61 is elastically spread to allow the aforementioned unit to be housed into the case 60. The edge 61 can prevent the tiles 30 and the resin net 20 from coming off the case 60.

When the case 60 is made of metal, the edge 61 may be bent after the aforementioned unit is housed into the case 60.

The obtained tile unit 10 can be used as a coaster. Specifically, the coaster (tile unit 10) is placed on a table or a counter with the tiles 30 facing upward, and a fancy wine glass is placed on the coaster (tile unit 10). A coaster suitable for a fancy wine glass is provided. In addition, the edge 61 can function as a frame, and therefore the tile unit 10 illustrated in FIG. 6A can be used as a wall-hanging piece of art or as a piece of art in a photo frame.

As illustrated in FIG. 6B, the tile unit 10 includes the resin net 20, the tiles 30 disposed on the front side of the resin net 20, and the case 60 disposed on the back side of the resin net 20.

A unit in which the tiles 30 are bonded and fixed to the resin net 20 is housed into the cylindrical case 60 having a bottom. In this case, the tiles 30 are bonded and fixed to the bottom of the case 60 with the resin net 20 interposed therebetween. The tile unit 10 illustrated in FIG. 6B is suitable as a coaster.

As illustrated in FIG. 6C, the tile unit 10 includes the resin net 20, the tiles 30 disposed on the front side of the resin net 20, and a somewhat large case 60 disposed on the back side of the resin net 20.

A unit in which the tiles 30 are bonded and fixed to the resin net 20 is housed into the somewhat large case 60, and a space between the aforementioned unit and the inner surface of a wall 62 of the case 60 is filled with an edging material 63 of an appropriate color.

Because the edging material 63 can function as a frame, the tile unit 10 illustrated in FIG. 6C is suitable as a wall-hanging piece of art or a piece of art in a photo frame. This tile unit 10 is also suitable as a coaster.

Each of the tile units 10 illustrated in FIGS. 6A to 6C includes the resin net 20. Therefore, the inclinations of the front surfaces of adjacent tiles 30 differ slightly from each other. This enhances design sophistication. Because the resin net 20 acts as a cushion, the tiles 30 are less likely to be damaged.

The tiles 30 are housed all together into the single case 60. Therefore, the tile unit 10 that is less expensive and that is easy to handle is provided.

As illustrated in FIG. 1, the tile unit 10 of the embodiment of the present invention provides an appearance resembling an array of gems and provides a sense of luxuriousness. Therefore, the tile unit 10 can be fitted into a lateral wall of a counter in a high-class restaurant or into a wall of a lobby in a high-class hotel or an art museum. In addition, the tile unit(s) 10 of the embodiment of the present invention can be fitted into the entirety or a part of a wall in a dressing room (a lavatory or a powder room).

Furthermore, the tile unit 10 can be constituted by tiles 30 made of different materials, having different colors, or having different patterns, and the tile unit 10 can be hung on a wall of the like in the form of a piece of art (work of art). Therefore, the use of the tile unit 10 is not limited.

In addition, the shape of the tile 30 may not be a trapezoidal shape in a cross-sectional view, e.g., the lateral surface 36 may extend orthogonal to the front surface 31. The shape of the tile 30 is not limited. The dimensions and the materials of the tile 30 may be determined as desired and are not limited to those described in the embodiment and the modifications.

Although the assumption is that the tile unit 10 of the embodiment of the present invention is fitted onto the wall surface 50, the tile unit 10 can also be fitted onto an upper surface of a table, a ceiling surface, or a floor surface. Therefore, the tile unit 10 can be mounted onto any desired target.

The tile 30 illustrated in FIG. 2A may be obtained as follows. Specifically, crushed rock obtained by crushing natural rock may be mixed with pebbles that are a type of natural rock, and the mixture may then be solidified with an adhesive resin into a panel shape. The tiles 30 are slightly tilted by the resin net 20, and the crushed rock and the pebbles provide various reflection surfaces. Therefore, an optically interesting phenomenon can be expected.

What is claimed is:

1. A tile unit comprising a resin net, a plurality of tiles disposed on a front side of the resin net, and a magnet sheet disposed on a back side of the resin net, the plurality of tiles being bonded and fixed to the magnet sheet with the resin net interposed therebetween, the resin net is configured by twisted yarn with nonuniform diameter, each of the plurality of tiles is mounted onto the magnet sheet with a front surface of the plurality of tiles being tilted at an angle relative to the magnet sheet, thereby defining a tilted angle for each of said plurality of tiles, wherein the tilted angle of one of the plurality of tiles is different from the tilted angle of an adjacent one of the plurality of tiles.

2. The tile unit according to claim 1, wherein a jointing space is provided between said one of the plurality of tiles and the adjacent one of the plurality of tiles, each of the plurality of tiles has a trapezoidal shape in a cross-sectional view, and a back surface of each of the plurality of tiles, which comes into contact with the resin net, has a smaller area than a front surface thereof, the jointing space is not filled with anything.

3. The tile unit according to claim 1, wherein each of the plurality of tiles is made of a material selected from the group consisting of glass, natural rock, ceramics, wood, and painted resin.

4. The tile unit according to claim 3, wherein the natural rock includes crushed rock obtained by crushing natural rock, a pebble, and an adhesive resin that bonds a mixture of the crushed rock and the pebble.

* * * * *